(12) United States Patent
Al Ahmad et al.

(10) Patent No.: US 11,177,840 B1
(45) Date of Patent: Nov. 16, 2021

(54) SMART MULTIBAND ANTENNA SYSTEM

(71) Applicant: UNITED ARAB EMIRATES UNIVERSITY, Al Ain (AE)

(72) Inventors: Mahmoud F. Al Ahmad, Al Ain (AE); Khaled Alhashmi, Al Ain (AE)

(73) Assignee: UNITED ARAB EMIRATES UNIVERSITY, Al Ain (AE)

( * ) Notice: Subject to any disclaimer, the term of this patent is extended or adjusted under 35 U.S.C. 154(b) by 0 days.

(21) Appl. No.: 17/133,605

(22) Filed: Dec. 23, 2020

(51) Int. Cl.
| | |
|---|---|
| *H04W 4/00* | (2018.01) |
| *H04B 1/00* | (2006.01) |
| *H04B 7/08* | (2006.01) |
| *H04B 7/185* | (2006.01) |
| *H04B 1/18* | (2006.01) |
| *H01Q 3/36* | (2006.01) |

(52) U.S. Cl.
CPC ............ *H04B 1/0064* (2013.01); *H01Q 3/36* (2013.01); *H04B 1/18* (2013.01); *H04B 7/0837* (2013.01); *H04B 7/18515* (2013.01)

(58) Field of Classification Search
CPC ...... H04B 1/0064; H04B 7/0617; H04B 7/04; H04B 1/40; H04B 17/12; H04B 1/0053; H04B 1/18; H04B 7/0837; H04B 1/04; H04B 7/0413; H01Q 3/36; H01Q 3/26; H01Q 25/00; H01Q 3/28; H01Q 1/243; H01Q 3/2694; H01Q 5/314
See application file for complete search history.

(56) References Cited

U.S. PATENT DOCUMENTS

| | | | |
|---|---|---|---|
| 5,838,282 A * | 11/1998 | Lalezari ................... | H01Q 5/40 343/727 |
| 7,151,506 B2 | 12/2006 | Knowles et al. | |
| 7,420,524 B2 | 9/2008 | Werner et al. | |
| 8,212,739 B2 | 7/2012 | Sievenpiper | |
| 10,700,429 B2 | 6/2020 | Mehdipour et al. | |
| 2007/0091008 A1* | 4/2007 | Mortazawi ............. | H01Q 21/08 343/864 |
| 2014/0340274 A1 | 11/2014 | Montgomery et al. | |
| 2019/0103672 A1* | 4/2019 | Jackson ................. | H01P 1/185 |
| 2019/0348754 A1 | 11/2019 | Apostolos et al. | |

* cited by examiner

*Primary Examiner* — Nhan T Le
(74) *Attorney, Agent, or Firm* — Nath, Goldberg & Meyer; Richard C. Litman

(57) ABSTRACT

The smart multiband antenna system is used in a communications system having an array of multiple identical antennas configured to operate as a single multiband antenna, such as a phased array. A tunable or variable capacitor, such as a varactor, is integrated between each adjacent pair of antennas in the array to adjust the electrical length or spacing between the antennas in order to optimize antenna performance characteristics, such as beam steering. For a phased array, the tunable capacitor may be adjusted to maintain an antenna spacing of $\lambda/2$ between adjacent antennas. The multiband antenna is designed to operate on several bands, and may be used for efficient multiplexing.

9 Claims, 2 Drawing Sheets

SMART MULTIBAND ANTENNA SYSTEM

BACKGROUND

1. Field

The present disclosure relates to multiband antennas, and particularly to a smart multiband antenna system in which multiple elements of the multiband antenna are coupled by tunable or variable capacitors to change the electrical spacing between the elements, and hence the operating frequency of the antenna.

2. Description of the Related Art

The steady growth and increment in communications services and applications calls for the implementation and utilization of dynamic and reconfigurable communication approaches where agile frequency alignment should be considered.

The past several years has seen the development of new antenna systems for wireless communication terminals, 5G systems, satellite communications, and global navigation satellite systems (GNSS), among others. Recent design imperatives require the use of very lightweight, compact antennas. However, in spite of the recent improvements in antenna systems, there is still a need for improvement in multiband antenna systems.

Thus, a smart multiband antenna system solving the aforementioned problems is desired.

SUMMARY

The smart multiband antenna system is used in a communications system having an array of multiple identical antennas configured to operate as a single multiband antenna, such as a phased array. A tunable or variable capacitor, such as a varactor, is integrated between each adjacent pair of antennas in the array to adjust the electrical length or spacing between the antennas in order to optimize antenna performance characteristics, such as beam steering. For a phased array, the tunable capacitor may be adjusted to maintain an antenna spacing of $\lambda/2$ between adjacent antennas. The multiband antenna is designed to operate on several bands, and may be used for efficient multiplexing.

These and other features of the present subject matter will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

The smart multiband antenna system is used in a communications system having an array of multiple identical antennas configured to operate as a single multiband antenna, such as a phased array. A tunable or variable capacitor, such as a varactor, is integrated between each adjacent pair of antennas in the array to adjust the electrical length or spacing between the antennas in order to optimize antenna performance characteristics, such as beam steering. For a phased array, the tunable capacitor may be adjusted to maintain an antenna spacing of $\lambda/2$ between adjacent antennas. The multiband antenna is designed to operate on several bands, and may be used for efficient multiplexing.

The term "antenna array" is sometimes used to refer to an antenna having a single driven element, one or more director elements, and one or more reflector elements all mounted on a single beam, the elements having a length and a spacing designed to transmit or receive a narrow beam signal having high gain (this type of antenna is commonly known as a Yagi-Uda antenna, or simply a Yagi antenna). The term "antenna array" is also used to refer to an array of multiple identical antennas, each having a driven element, but configured so that the signals interact to provide enhanced performance. For present purposes, the term "antenna array" is used in the latter sense. An example of this is a phased array, in which the multiple antennas transmit or receive the same signal, but in different phases that either combine with each other in some directions or interfere with each other and cancel in other directions to produce a main lobe with high gain in a desired direction, permitting beam steering, even with a change in frequency.

Figure 1:
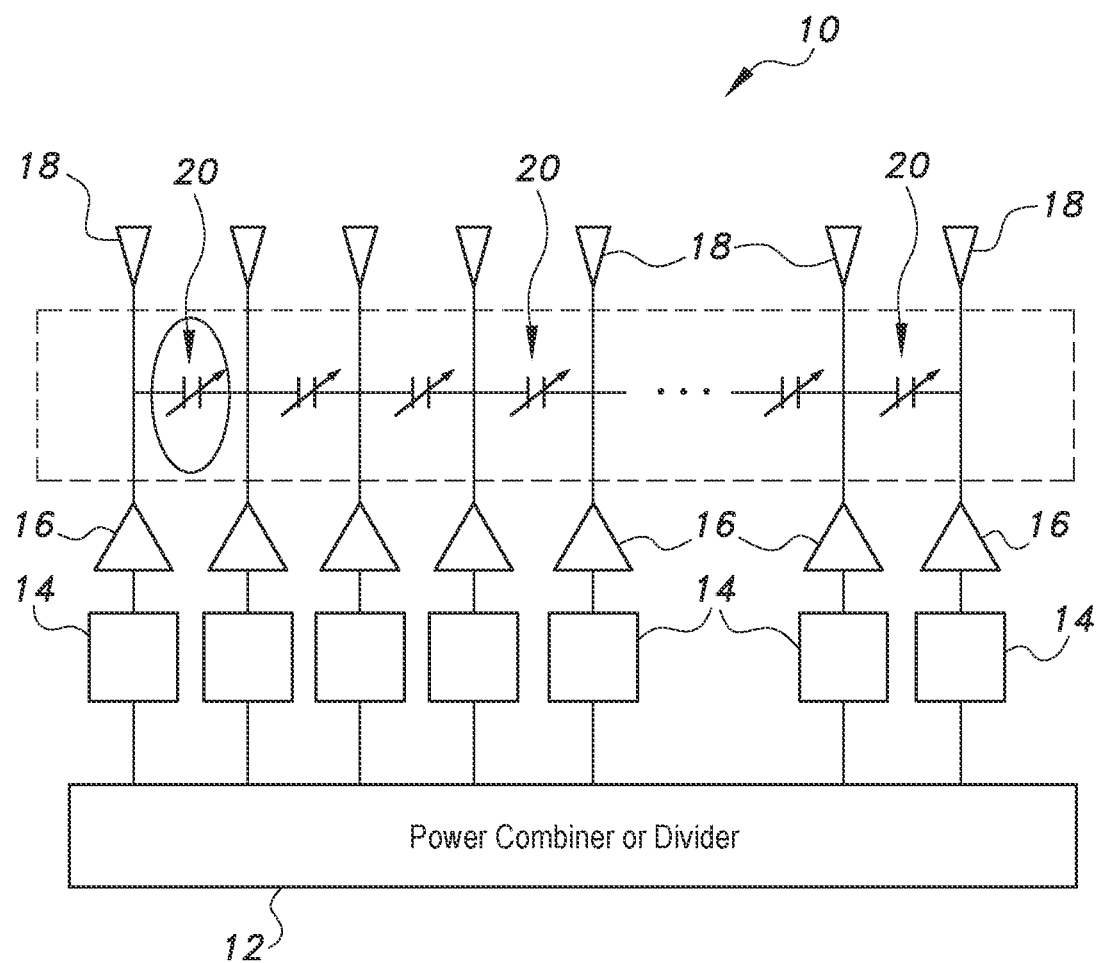
FIG. 1 is a schematic diagram of an exemplary smart multiband antenna system.

FIG. 1 shows an exemplary smart multiband antenna system, designated generally as 10 in the drawing. The system 10 includes a power combiner or divider (splitter) 12 that combines signals received from the antennas in the array or splits the signal to be transmitted for feeding to the antennas in the array. Each signal is processed in a corresponding phase shifter 14 and a corresponding amplifier/attenuator 16 for amplification before transmission or attenuation of received signals before processing by receiver circuits. Each amplifier/attenuator is connected to a corresponding antenna 18 in the array (also referred to as an element of the array) for transmission or reception of the signal.

As shown in FIG. 1, the system 10 includes a tunable or variable capacitor 20 connected between each adjacent pair of antennas 18. Variable capacitors of various types are available. However, variable capacitors that have air as the dielectric are generally bulky and are tuned mechanically. Since the present system is designed for such applications as 5G networks and satellite communications or satellite navigation systems, the tunable capacitors 20 are preferably varactor diodes, which are essentially voltage-controlled capacitors that may be tuned electronically by digital output from the processor of a computer under automatic control and shaped into an appropriate waveform by a digital-to-analog converter (DAC), as is known in the art. The schematic in FIG. 1 substantially shows a phased array. The optimal spacing between the antenna elements in a phased array is generally considered to be $\lambda/2$ (half-wavelength), where $\lambda$ is the desired operating frequency, so that for the system 10 shown in FIG. 1, the tunable capacitors would be programmed to maintain an electrical spacing of $\lambda/2$. Antenna arrays of different configuration may have a different optimal antenna spacing.

In the conventional design without using tunable capacitors to adjust the electrical length between the two adjacent elements, the distance will be constant. In this case, the beam steering will perform poorly when operating the system away from the operational frequency for which the distance between the elements has been designed physically. With using tunable electrical length, the distance between the elements can be adjusted electronically to the wave length of the operational frequency, which will improve the system performance.

Figure 2:
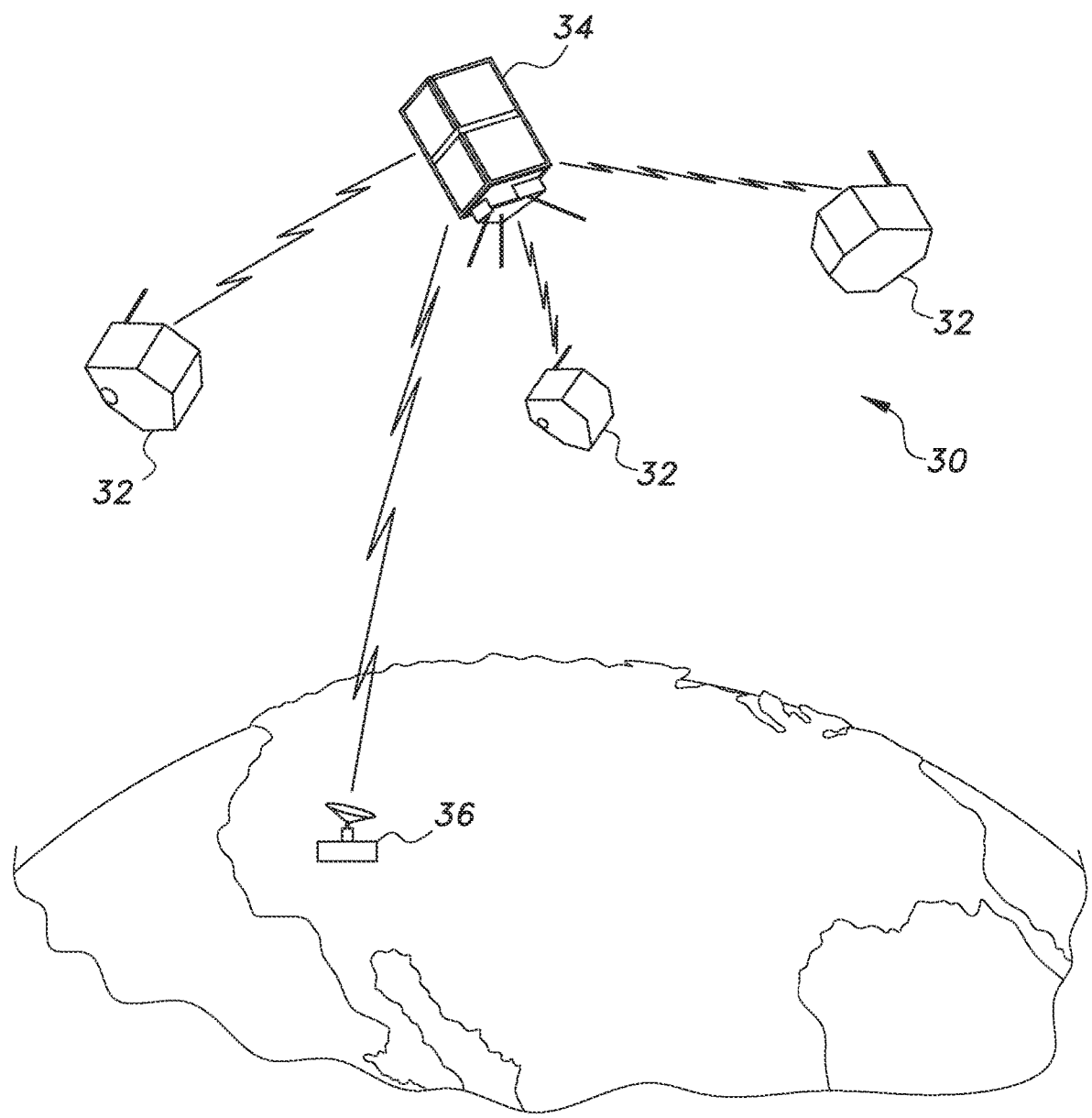
FIG. 2 is a schematic diagram of an exemplary satellite communications system that may use the smart multiband antenna system of FIG. 1.

As shown in FIG. 2, the smart multiband antenna system 10 could be used in a multi-node satellite system 30 within which a plurality of satellite nodes 32 collect data for space/earth observation and communicate directly with the main satellite 34 that, in turn, collects the data and sends it directly to a ground station 36. The smart multiband antenna system 10 may be installed on the main satellite 34 and each of the node satellites 32 to replace several antenna elements and processing units, which will result in compact, lighter weight, and rapid automatic data processing. The design makes use of compact, wireless, direct multiplexing of several signals on carriers with different protocols. The use of tunable capacitors 20 to maintain optimal electrical spacing between antennas 18 in each of the antenna arrays avoids the need for using gimbals or other mechanical devices to steer the radio frequency beams as the relative position of the satellites 32, 34 and ground station 36 in the network change, providing for compact, lightweight wireless radio communication.

It is to be understood that the smart multiband antenna system is not limited to the specific embodiments described above, but encompasses any and all embodiments within the scope of the generic language of the following claims enabled by the embodiments described herein, or otherwise shown in the drawings or described above in terms sufficient to enable one of ordinary skill in the art to make and use the claimed subject matter.

We claim:

1. A smart multiband antenna array system, consisting of:
a power combiner and divider for dividing a signal to be transmitted into multiple signals for transmission through multiple antennas in an antenna array, and for combining signals received by the antenna array into a single signal for processing by a radio receiver;
a plurality of identical single antennas configured to form an antenna array, wherein each of the single antennas operates as a multiband antenna;
a plurality of amplifiers/attenuators, each of the antennas in the antenna array having a corresponding one of the amplifier/attenuators connected between the power combiner and divider and the antenna for amplifying the signal to be transmitted and attenuating received signals;
a plurality of phase shifters, each of the antennas in the antenna array having a corresponding one of the phase shifters connected between the corresponding amplifier/attenuator and the power combiner and divider, the antenna array being configured as a phased array; and
a plurality of tunable capacitors, each adjacent pair of antennas in the antenna array having a corresponding one of the tunable capacitors connected between the adjacent pair, the tunable capacitor being configured for adjusting electrical spacing length between the adjacent pair of antennas to optimize beam forming and electrical performance.

2. The smart multiband antenna system of claim 1, wherein the tunable capacitors are configured to maintain electrical spacing between adjacent pairs of the antennas in the antenna array at one-half wavelength ($\lambda/2$), where is the operating frequency.

3. The smart multiband antenna system of claim 1 wherein the smart multiband antenna system is configured as a multiband antenna.

4. The smart multiband antenna system of claim 1, wherein the smart multiband antenna system is configured for multiplexing signals on multiple bands.

5. The smart multiband antenna system according to claim 1, wherein each of said tunable capacitors comprises a varactor diode.

6. A satellite communications network, comprising at least one satellite and a ground station, the at least one satellite and the ground station each having a smart multiband antenna system according to claim 1.

7. The satellite communications network according to claim 6, wherein said at least one satellite comprises a main satellite and at least one satellite node for communicating data to the main satellite.

8. The satellite communications network according to claim 6, wherein the satellite communications network comprises a satellite navigation network.

9. A communications network having a plurality of stations, each of the stations having a smart multiband antenna system according to claim 1, the communications network being a network selected from the group consisting of a 5G network, a wireless data network, a satellite communications network, and a global navigation satellite system (GNSS) network.

* * * * *